(12) United States Patent
Yuen

(10) Patent No.: US 6,784,875 B2
(45) Date of Patent: Aug. 31, 2004

(54) RUGGEDIZED, WATER SEALED, SECURITY-ENHANCED TOUCHPAD ASSEMBLY

(75) Inventor: Siltex Peter Yuen, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/044,095

(22) Filed: Jan. 11, 2002

(65) Prior Publication Data

US 2003/0132917 A1 Jul. 17, 2003

(51) Int. Cl.[7] .............................................. G06K 11/16
(52) U.S. Cl. .................................... 345/173; 178/18.08
(58) Field of Search .................................. 345/173, 174, 345/175, 176, 177, 178; 178/18.01–18.02, 18.03, 18.04, 18.05, 18.06, 18.07, 18.08, 18.09, 18.1, 18.11, 19.01

(56) References Cited

U.S. PATENT DOCUMENTS

| | | | | |
|---|---|---|---|---|
| 4,812,830 | A | * 3/1989 | Doering | 345/175 |
| 5,729,250 | A | * 3/1998 | Bishop et al. | 345/175 |
| 5,990,874 | A | * 11/1999 | Tsumura et al. | 345/173 |
| 6,002,389 | A | * 12/1999 | Kasser | 345/173 |
| 6,088,024 | A | * 7/2000 | Yamagata | 345/173 |
| 6,089,646 | A | * 7/2000 | Xu et al. | 296/146.15 |
| 6,137,555 | A | * 10/2000 | Tamura et al. | 349/95 |
| 6,219,038 | B1 | 4/2001 | Cho | |
| 6,259,491 | B1 | 7/2001 | Ekedahl et al. | |
| 6,304,251 | B1 | * 10/2001 | Ito et al. | 345/173 |
| 6,590,337 | B1 | * 7/2003 | Nishikawa et al. | 313/509 |
| 6,608,664 | B1 | * 8/2003 | Hasegawa | 349/160 |
| 6,614,423 | B1 | * 9/2003 | Wong et al. | 345/173 |
| 6,628,074 | B1 | * 9/2003 | Saito et al. | 313/582 |
| 2002/0063695 | A1 | * 5/2002 | Canova | 345/173 |

FOREIGN PATENT DOCUMENTS

| | | |
|---|---|---|
| EP | 0 684 578 A3 | 11/1995 |
| EP | 0 684 578 A2 | 11/1995 |
| JP | 10 207630 | 8/1998 |
| JP | 11 353116 | 12/1999 |

* cited by examiner

Primary Examiner—Vijay Shankar
Assistant Examiner—Nitin Patel
(74) Attorney, Agent, or Firm—Dorsey & Whitney LLP

(57) ABSTRACT

A touchpad assembly is ruggedizing and sealed against moisture. The assembly includes a touchpad that receives a user-generated data signal that is cable-coupled to a printed circuit board assembly (PCBA), which components are disposed upon a support lens. A shield over-covers the touchpad assembly but has an through-opening providing user-access to the touchpad. An anti-theft mechanism secures the shield to the PCBA, and a security chamber space is sealingly defined between the shield, PCBA, and the support lens. The security chamber space is secured with injected resin, into which the anti-theft latch is thereby molded. A cable opening in the support lens is water sealed using double-sided adhesive tape or the like.

35 Claims, 4 Drawing Sheets

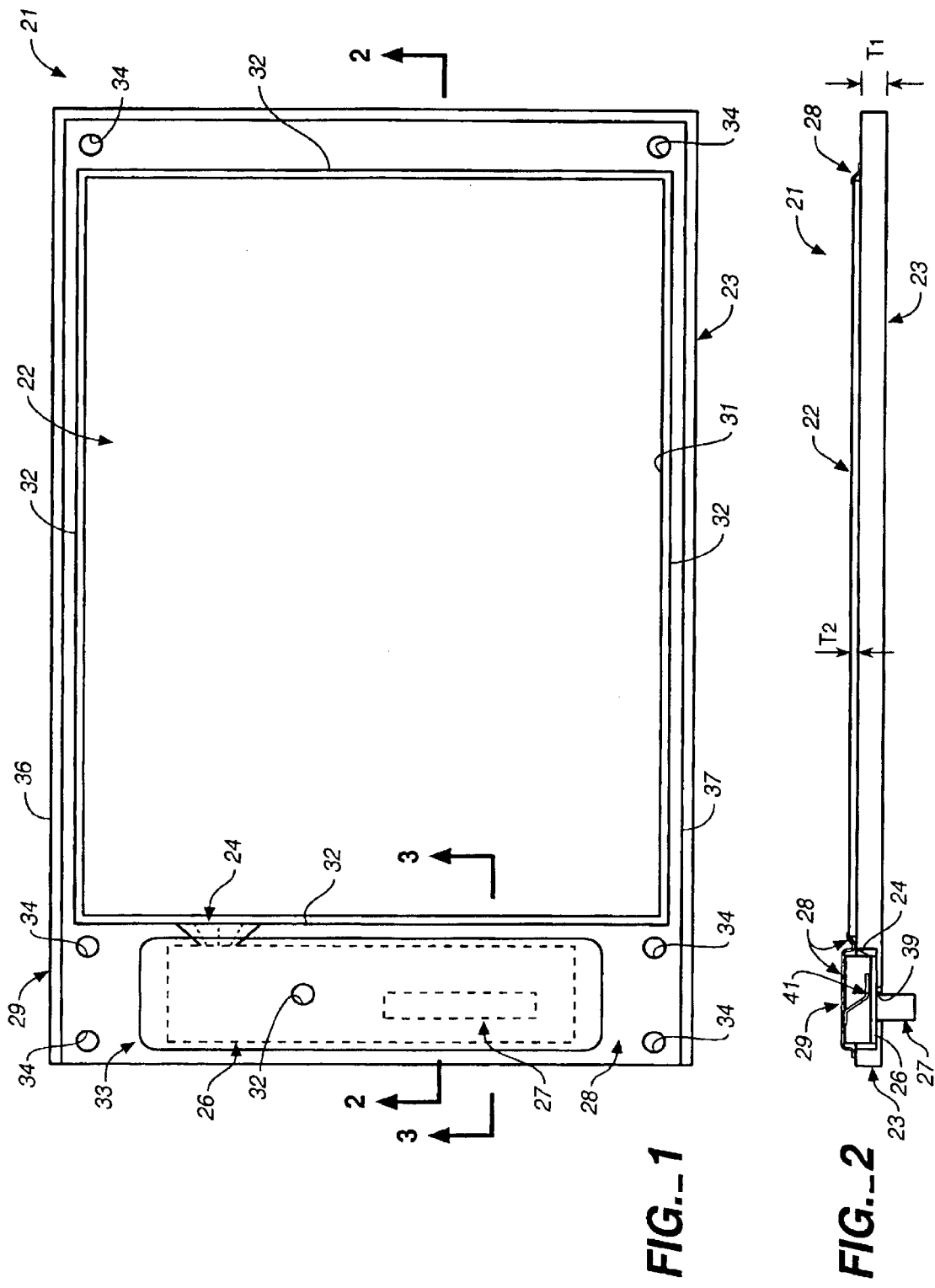

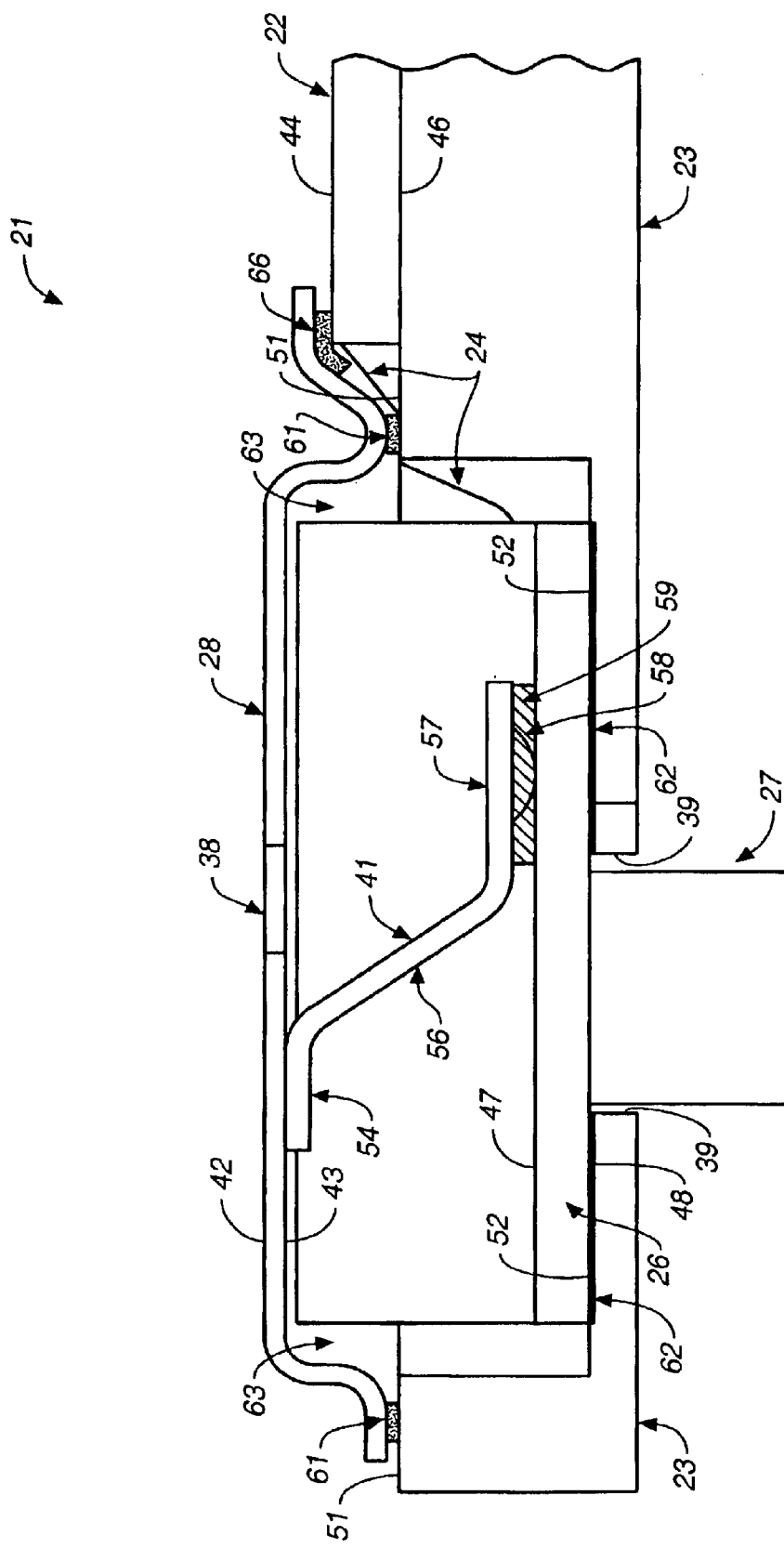

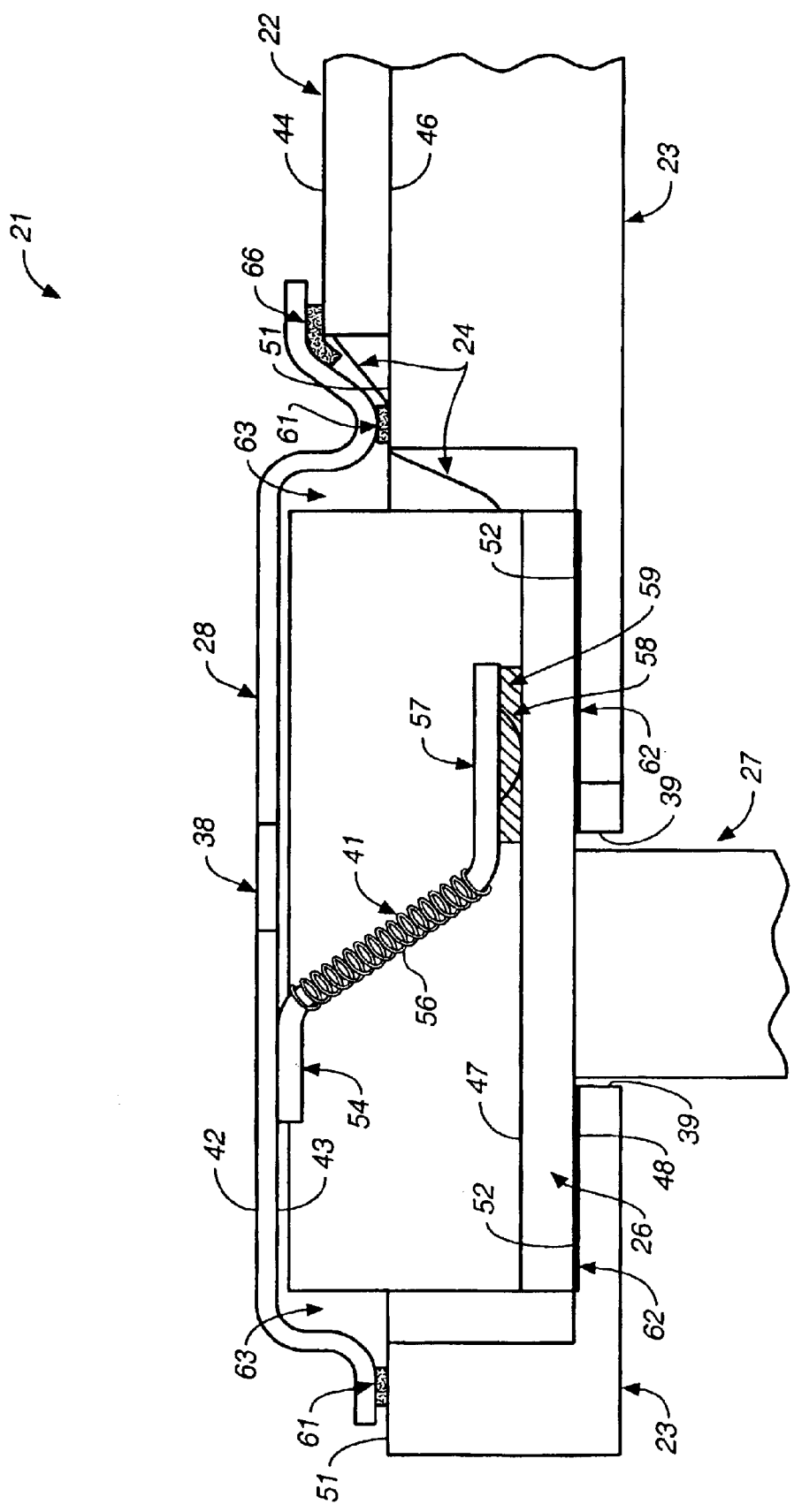
FIG._3A

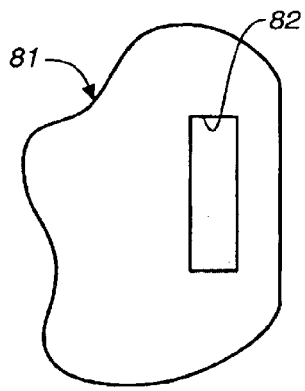
FIG._4
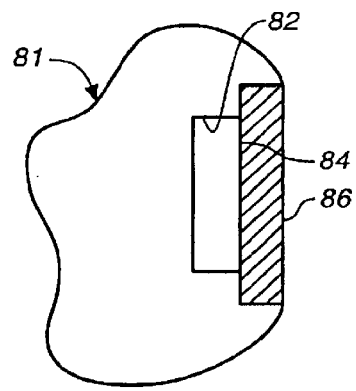
FIG._5
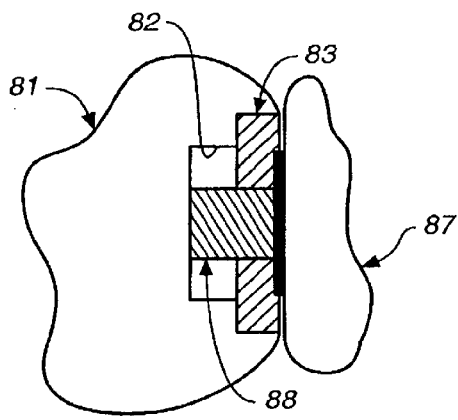
FIG._6
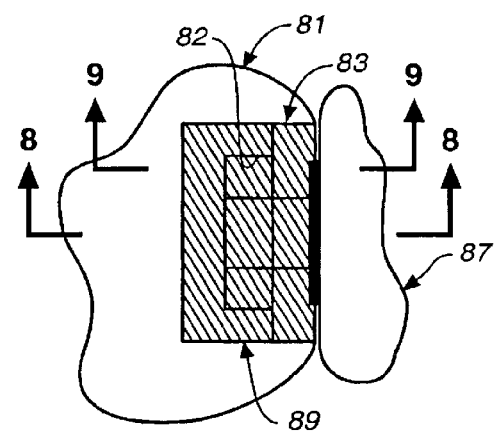
FIG._7
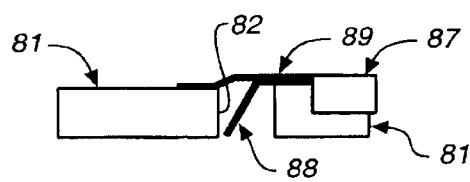
FIG._8
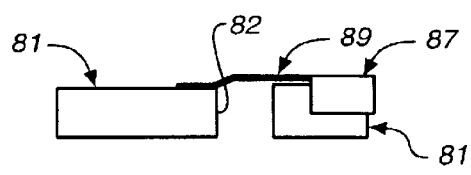
FIG._9

RUGGEDIZED, WATER SEALED, SECURITY-ENHANCED TOUCHPAD ASSEMBLY

FIELD OF THE INVENTION

The present invention relates generally to touchpad assemblies, and more particularly to point of sales (POS) units with touchpads that are ruggedized and water-sealed such that the invention protects raw data from theft.

BACKGROUND OF THE INVENTION

Touchpads are well-known input devices for digital systems including personal computers, games, hand held personal organizers, POS units, and the like. Touchpads operate by detecting the presence and movement of a pointing element manipulated by a user, e.g., a pen, a stylus, or a user-finger. Detected pointing element movement is translated electronically into movement of a cursor on a display screen, into commands, or other input that is recognizable by a machine or device with which the touchpad is used. Generally, a touchpad assembly includes a touchpad, a cable, a printed circuit board assembly (PCBA), a support lens, and a shield over the top of the assembly.

A touchpad assembly that is not properly sealed can subject the touchpad components to damage from liquids or food spilled by a user onto the top of the assembly. Similarly, a touchpad assembly that has poor internal structural design due to lack of internal support may be damaged by force applied to the assembly. Further, a touchpad assembly that is too readily disassembled may be prone to component theft.

Thus, there is a need for a touchpad with improved sealing, to better guard against damage from spills of liquid, food, etc. into the top of the assembly. Such touchpad should have a stronger internal support to better guard against damage from force applied to the assembly. Further, there is a need for a touchpad assembly with improved anti-theft characteristics.

The present invention provides such a touchpad assembly.

SUMMARY OF THE INVENTION

A ruggedized, water-sealed and secure touchpad assembly includes a touchpad having spaced-apart first and second surfaces, a printed circuit board assembly (PCBA) that is coupled to a cable to receive user-input data signals. The assembly also includes a support lens upon whose surface lie the touchpad and the PCBA, and further includes a shield that over-covers the touchpad, the cable, and the PCBA, in which the shield includes an opening providing access to the touchpad. An anti-theft latch mechanism secures the PCBA to the shield to promote anti-theft and water-resistant characteristics of the touchpad assembly.

Other features and advantages of the invention will appear from the following description in which the preferred embodiments have been set forth in detail, in conjunction with the accompanying drawings.

BRIEF DESCRIPTION OF THE DRAWINGS

FIG. 1 is a top plan view of a touchpad assembly, according to the present invention, without application of force to the touchpad surface;

FIG. 2 is an end elevational view of the touchpad assembly of FIG. 1, taken along the line 2—2;

FIG. 3a is an end elevational view of the touchpad assembly as shown in FIG. 3, where the anti-theft latch includes a spring, according to an embodiment of the present invention.

FIG. 4 is a top plan view of a portion of the support lens of the touchpad assembly depicting a cable opening, according to the present invention;

FIG. 5 is a top plan view of a portion of the support lens of the touchpad assembly of FIG. 4, further depicting a strip of double-sided adhesive tape, according to the invention;

FIG. 6 is a top plan view of a portion of the support lens of the touchpad assembly of FIG. 5, further depicting a portion of the touchpad, and a portion of a cable, according to the present invention;

FIG. 7 is a top plan view of a portion of the support lens of the touchpad assembly of FIG. 6, further depicting a larger strip of adhesive tape, according to the present invention;

FIG. 8 is an end elevational view of a portion of the support lens of one embodiment of the touchpad assembly of FIG. 7, taken along the line 8—8, according to the present invention; and FIG. 9 is an end elevational view of a portion of the support lens of one embodiment of the touchpad assembly of FIG. 7, taken along the line 9—9, according to the present invention.

DETAILED DESCRIPTION OF THE PREFERRED EMBODIMENT

FIG. 1 is a top plan view of a touchpad assembly 21, touchpad 22, and support lens 23, according to the present invention. As also seen in FIGS. 1–3, touchpad 22 and lens 23 are preferably substantially planar and may be rectangular in plan view. The first end of a cable 24, which may be a flex cable, is coupled to touchpad 22, as shown in FIGS. 1 and 2. A printed circuit board assembly (PCBA) 26 is coupled to the opposite end of cable 24. Touchpad assembly 21 further includes a support lens 23 and PCBA 26 preferably lies on support lens 23, next to touchpad 22. A protective shield 28 covers PCBA 26 and cable 24. Support lens 23 may be fabricated from optical quality transparent material, such as polycarbonate or glass. The plane of support lens 23 may be parallel and adjacent touchpad 22.

In practice, an encrypted signal output 27 is coupled to the underside of PCBA 26. In FIG. 1, cable 24 and PCBA 26, and encrypted signal output 27 are shown in phantom, as they are concealed by a protective and preferably planar shield 28. In the embodiment shown, cable 24, PCBA 26, and encrypted signal output 27, lie along one width 29 of touchpad 22.

As best seen in FIG. 1, shield 28, which may be made of a metalized material, includes an opening 31 sized to permit accessing touchpad 22 via the opening. The shield 28 covers the edges 32 of the touchpad 22, as shown in FIG. 2, and also covers the cable 24, PCBA 26, and encrypted signal output 27. As shown, shield 28 can include at least one through-mounting hole 34 to facilitate mounting the shield to support lens 23 using screws, rivets, or other mounting mechanisms. In the embodiment shown, shield 28 has six mounting holes 34: one near each shield corner, and two located near touchpad 22, which also has corner holes or openings as well. As such, two pairs of three holes 34 lie along the opposite first edge 36 and second edge 37 of the shield 28. Shield 28 has opposite first edge 36 and second edge 37 extending the length of the shield. Shield 28 may also define at least one injection port 38, that extends through the shield above PCBA 26 and support lens 23. Preferably, shield 28 has a single hole as injection port 38, which may be located over the center region of PCBA 26 and adjacent touchpad 22. Such injection port(s) permit injecting encapsulation resin into a security chamber space 63, which is described below.

FIG. 2 is an end elevational view of the touchpad assembly 21 of FIG. 1 taken along the line 2—2 of FIG. 1, and shows explicitly cable 24, PCBA 26, and encrypted signal output 27, which were shown in phantom in FIG. 1. The encrypted signal output 27 is preferably coupled to the lower region of PCBA 26, such that the encrypted signal output 27 passes through an opening 39 of the support lens 23. FIG. 2 also depicts anti-theft latch 41, which preferably secures shield 28 to PCBA 26. The anti-theft latch is preferably a piece of conductive material that is strong, metal for example. Further details of latch 41 will be given later herein with respect to FIG. 3.

In a preferred embodiment, support lens 23 has a thickness T1 that is perhaps three times the thickness T2 of touchpad 22, and shield 28 has a thickness less T2. Note that cable 24, PCBA 26, encrypted signal output 27, and anti-theft latch 41 preferably lie along touchpad 22 width 29.

Preferably, PCBA 26 and encrypted signal output 27 have rectangular block shapes, with PCBA 26 being larger in shape than the encrypted signal output, which preferably extends perpendicularly from PCBA 26. Exemplary relative sizes of the cable 24, PCBA 26, and pass through opening 39 of the support lens 23 from the top plan view of the touchpad assembly are shown in phantom in FIG. 1.

During actual use, a user inputs a data signal to touchpad 22 using a pointer, a stylus, a finger, etc. Touchpad 22 couples the data signal via cable 24 to the PCBA 26, which preferably is an encryption electronic PCBA 26, as shown in FIGS. 1–3. PCBA 26 processes and encrypts the data signal received from the touchpad 22 and couples a processed and encrypted data signal to the encrypted signal output connector 27.

FIG. 3 is an end elevational view of the touchpad assembly of FIG. 1 taken along the line 3—3 of FIG. 1. As shown in FIG. 3, shield 28 has spaced-apart first and second surfaces 42 and 43, and touchpad 22 has spaced-apart first and second surfaces 44 and 46, while PCBA 26 has spaced-apart first and second surfaces 47 and 48. As shown, support lens 23 has spaced-apart first and second surfaces 51 and 52.

As shown in FIG. 3, anti-theft latch 41 secures shield 28 to the PCBA 26. Upper latch portion 54 preferably is electrically coupled to shield second surface 43, while latch lower portion 57 is electrically coupled to PCBA first surface 47. Latch 41 includes a central region 56 that transitions between the upper and lower latch portions. In FIG. 3, lower latch portion 57 couples to a ground contact 58 that is in turn coupled to a ground pad 59 on first surface 47 of PCBA 26.

FIG. 3 shows in detail the mounting of the shield 28 to the touchpad assembly 21. Preferably a plurality of first chamber seals 61, which may be strips of adhesive material, are disposed around the perimeter of the PCBA 26, between shield second surface 43 and lens first surface 51. These first chamber seals 61 are compressed by the shield 28 when the shield 28 is mounted to the support lens 23. A plurality of second chamber seals 62, which may also be strips of adhesive material, is disposed between the PCBA second surface 48 and support lens second surface 52. The first and second chamber seals 61, 62 form a security chamber space 63 that is defined between portions of shield 28, PCBA 26, and support lens 23.

As shown in FIG. 3, touchpad assembly 21 preferably includes a shock isolation mounting 66 that may be implemented using strips of material disposed along the perimeter of touchpad first surface 44, between shield second surface 43, In a preferred embodiment, anti-theft latch 41 is a spring, preferably a metallic spring that may be welded or otherwise electrically coupled to shield second surface 43. Preferably, electrical coupling between anti-theft latch 41 and PCBA 26 is implemented with conductive double-sided adhesive mater that be a gasket. Anti-theft latch 41 preferably defines a somewhat "Z"-shape such that latch central portion 56 extends downward from top portion 54 at approximately 45° to latch lower portion 57.

Preferably, first chamber seals 61 are adhesive gaskets, and second chamber seals 62 are double-sided adhesive gaskets. When shield 28 is mounted to support lens 23, seals 61 and 62 become somewhat compressed and can form watertight seals along the surfaces of the seals. As noted, shield injection port 38 is an opening about the size of a mounting hole 34 above the center of the PCBA 26 (see FIG. 1). Once encapsulation resin has been injected through the injection port 38 into the security chamber space 63, the anti-theft latch 41 is molded into the encapsulation resin. Advantageously, after the resin has set and cured, PCBA 26 cannot then be disassembled. For ease of manufacturing, preferably a set amount of resin is used. The result is that PCBA 26 is watertight, by virtue of seals 61 and 62, and the PCBA is also protected from theft by virtue of securement of anti-theft latch 41.

In a preferred embodiment, shock isolation mounting 66 is disposed along the perimeter of the touchpad 22, beneath shield 28. A downward force from shield 28, once mounted to support lens 23, via shock isolation mounting 66, retains touchpad 22 against first surface 51 of support lens 23. As such, shock isolation mounting 66 helps ruggedize the touchpad assembly as pressure against shield first surface 42 is less likely to damage the touchpad first surface 44.

In addition, when anti-theft latch 41 is a robust component such as a metal spring, latch 41 helps ruggedize touchpad assembly 21 by providing internal structural support. As such, any damage resulting from a user-exerted downward force upon touchpad assembly 21 is diminished by virtue of the structural support provided by latch 41. Further, as upper portion 54 of the anti-theft latch 41 is welded to the shield 28, while lower portion 57 of the anti-theft latch 41 is coupled to the PCBA 26 by a double-sided adhesive, touchpad assembly 21 components are more securely fastened. The overall assembly is not only more robust, but is rendered less vulnerable to damage from theft.

FIG. 4 is a top plan view of a portion of the touchpad assembly support lens 81, showing a cable opening 82 extending through the support lens. Understandably, cable opening 82 is sized to admit passage of cable 26.

FIG. 5 is a top plan view of a portion of the support lens 81 of the touchpad assembly with the elements of FIG. 4 and also shows a strip of double-sided adhesive tape 83. FIG. 5 shows a strip of double-sided adhesive tape 83 adjacent to the surface of the support lens 81 and which lies between the edge 84 of the opening 82 and the edge 86 of the support lens 81.

FIG. 6 is a top plan view of a portion of the support lens 81 structure shown in FIG. 5, and further depicts a portion of touchpad 87, and a portion of cable 88. Cable 88, which is coupled to the touchpad 87, is disposed on the surface of at least a portion of the double-sided adhesive tape 83, and passed through cable opening 82. Thus, tape 83 preferably adheres to at least a portion of cable 88.

FIG. 7 is a top plan view of a portion of the support lens 81 structure shown in FIG. 6, and also depicts an additional and strip of adhesive tape 89. In FIG. 7, adhesive tape 89 is shown disposed over cable opening 82 and the double-sided adhesive tape 83.

In a preferred embodiment, cable 88 is a flex cable, and cable opening 82 is rectangular in cross-section. In such embodiment, double-sided adhesive tape 83 is disposed between edge 84 of the rectangular cable opening and edge 86 of the support lens 81. The length of opening 82 may run parallel to edge 86 of the support lens 81 and can be formed fairly close to the edge 86 of the support lens 81. The double-sided adhesive tape 83 advantageously helps keep cable 88 in place and also acts as a sealant under the cable 88. The larger strip of adhesive tape 59 seals the cable opening 82, to protect the underlying circuitry of the touchpad assembly from entry of liquids or other foreign substances.

In a preferred embodiment, double-sided adhesive tape 83 and the larger strip adhesive tape 89 completely cover the length of cable 88 from the touchpad 87 to the cable opening 82, as shown in FIGS. 8 and 9.

FIG. 8 is an end elevational view of a portion of the support lens 81 structure of FIG. 7, taken along line 8—8. In this embodiment, cable 88 lies adjacent the support lens 81, from the touchpad 87 to the cable opening 82. As shown in FIG. 8, larger strip of adhesive tape 89 preferably completely over-covers the length of cable 88 extending from touchpad 87 to cable opening 82, as well as the cable opening 82.

FIG. 9 is an end elevational view of a portion of the support lens 81 of FIG. 7, taken along the line 9—9. FIG. 9 depicts the larger strip of adhesive tape 89 covering all portions of the cable opening 82, including portions through which cable 88 is not passed, since generally cable opening 82 will be larger than the size of cable 88.

It will be appreciated that the sizes and shapes and dispositions of various touchpad assembly and touchpad assembly components can be varied, without departing from the spirit and scope of the invention. Similarly, the size and location of mounting holes, injection ports, and the like may be varied. While the sealing of the security chamber space has been described with respect to use of adhesive tape or gaskets, other sealing mechanisms may instead (or in addition) be used. While ruggedization and water-sealing techniques have been described with respect to application with touchpad assemblies such as used for POS units, the described techniques may be applied to other touchpad assemblies, including without limitation assemblies used to obtain electronic signatures, and to create electronic drawings.

Modifications and variations may be made to the disclosed embodiments without departing from the subject and spirit of the invention as defined by the following claims.

What is claimed is:

1. An apparatus for ruggedizing and securing a touchpad assembly comprising:
    a touchpad having spaced-apart first and second surfaces, to receive a data signal from a user and to couple said signal to a cable;
    a printed circuit board assembly (PCBA) having spaced-apart first and second surfaces, said PCBA coupled to said cable to receive said data signal from said touchpad;
    a support having a first surface upon which said touchpad and said PCBA are disposed;
    a shield having spaced-apart first and second surfaces, said shield over-covering said touchpad, said cable, and said PCBA, and defining a through opening in said first surface overlying and permitting access to said touchpad;
    an anti-theft latch securing said shield to said PCBA to enhance at least one of water-proofing and theft-vulnerability of said apparatus, wherein said anti-theft latch comprises a spring.

2. An apparatus for ruggedizing and securing a touchpad assembly comprising:
    a touchpad having spaced-apart first and second surfaces, to receive a data signal from a user and to couple said signal to a cable;
    a printed circuit board assembly (PCBA) having spaced-apart first and second surfaces, said PCBA coupled to said cable to receive said data signal from said touchpad;
    a support having a first surface upon which said touchpad and said PCBA are disposed;
    a shield having spaced-apart first and second surfaces, said shield over-covering said touchpad, said cable, and said PCBA, and defining a through opening in said first surface overlying and permitting access to said touchpad;
    an anti-theft latch securing said shield to said PCBA to enhance at least one of water-proofing and theft-vulnerability of said apparatus, wherein said anti-theft latch includes a metallic material.

3. The apparatus of claim 1, wherein said spring comprises an upper portion, a central portion, and a lower portion, such that said upper portion is coupled to said second surface of said shield, said lower portion is coupled to said first surface of said PCBA, and said central portion extends from said upper portion and angles downward toward said lower portion.

4. An apparatus for ruggedizing and securing a touchpad assembly comprising:
    a touchpad having spaced-apart first and second surfaces, to receive a data signal from a user and to couple said signal to a cable;
    a printed circuit board assembly (PCBA) having spaced-apart first and second surfaces, said PCBA coupled to said cable to receive said data signal from said touchpad;
    a support having a first surface upon which said touchpad and said PCBA are disposed;
    a shield having spaced-apart first and second surfaces, said shield over-covering at least a portion of said touchpad, said cable, and said PCBA, and defining a through opening in said first surface overlying and permitting access to said touchpad; and
    a seal coupling said shield to said support and said cable to enhance at least one of water-proofing and theft-vulnerability of said apparatus.

5. The apparatus of claim 1, wherein said seal includes at least one chamber seals to seal and define a security chamber space between portions of said shield, said PCBA, and said support lens.

6. The apparatus of claim 4, wherein said chamber seals include a plurality of first chamber seals disposed between the second surface of said shield and the first surface of said support, around a perimeter of said PCBA.

7. The apparatus of claim 6, wherein said first chamber seals comprise adhesive material.

8. The apparatus of claim 7, wherein said adhesive material comprises a gasket.

9. The apparatus of claim 5, wherein said chamber seals comprise a plurality of second chamber seals that lie between said second surface of said PCBA and said first surface of said support.

10. The apparatus of claim 9, wherein said second chamber seals comprise a double-sided adhesive material.

11. The apparatus of claim 10, wherein said adhesive material comprises a gasket.

12. The apparatus of claim 1, wherein said means for securing includes an anti-theft latch.

13. An apparatus for ruggedizing and securing a touchpad assembly comprising:
    a touchpad having spaced-apart first and second surfaces, to receive a data signal from a user and to couple said signal to a cable;
    a printed circuit board assembly (PCBA) having spaced-apart first and second surfaces, said PCBA coupled to said cable to receive said data signal from said touchpad;
    a support having a first surface upon which said touchpad and said PCBA are disposed;
    a shield having spaced-apart first and second surfaces, said shield over-covering said touchpad, said cable, and said PCBA, and defining a through opening in said first surface overlying and permitting access to said touchpad;
    an anti-theft latch securing said shield to said PCBA to enhance at least one of water-proofing and theft-vulnerability of said apparatus, wherein said shield defines at least one injection port through which encapsulation resin is injectable into said security chamber space; and
    wherein said anti-theft latch is molded into said encapsulation resin such that upon setting and curing of said resin, said PCBA is not readily disassembled from said apparatus.

14. The apparatus of claim 13, wherein a set mount of said encapsulation resin is injected into said security chamber space.

15. An apparatus for ruggedizing and securing a touchpad assembly comprising:
    a touchpad having spaced-apart first and second surfaces, to receive a data signal from a user and to couple said signal to a cable;
    a printed circuit board assembly (PCBA) having spaced-apart first and second surfaces, said PCBA coupled to said cable to receive said data signal from said touchpad;
    a support having a first surface upon which said touchpad and said PCBA are disposed;
    a shield having spaced-apart first and second surfaces, said shield over-covering said touchpad, said cable, and said PCBA, and defining a through opening in said first surface overlying and permitting access to said touchpad;
    an anti-theft latch securing said shield to said PCBA to enhance at least one of water-proofing and theft-vulnerability of said apparatus, wherein a portion of said anti-theft latch is welded to said second surface of said shield.

16. An apparatus for ruggedizing and securing a touchpad assembly comprising:
    a touchpad having spaced-apart first and second surfaces, to receive a data signal from a user and to couple said signal to a cable;
    a printed circuit board assembly (PCBA) having spaced-apart first and second surfaces, said PCBA coupled to said cable to receive said data signal from said touchpad;
    a support having a first surface upon which said touchpad and said PCBA are disposed;
    a shield having spaced-apart first and second surfaces, said shield over-covering said touchpad, said cable, and said PCBA, and defining a through opening in said first surface overlying and permitting access to said touchpad;
    an anti-theft latch securing said shield to said PCBA to enhance at least one of water-proofing and theft-vulnerability of said apparatus, wherein said anti-theft latch is electrically coupled to said PCBA.

17. An apparatus for ruggedizing and securing a touchpad assembly comprising:
    a touchpad having spaced-apart first and second surfaces, to receive a data signal from a user and to couple said signal to a cable;
    a printed circuit board assembly (PCBA) having spaced-apart first and second surfaces, said PCBA coupled to said cable to receive said data signal from said touchpad;
    a support having a first surface upon which said touchpad and said PCBA are disposed;
    a shield having spaced-apart first and second surfaces, said shield over-covering said touchpad, said cable, and said PCBA, and defining a through opening in said first surface overlying and permitting access to said touchpad;
    an anti-theft latch securing said shield to said PCBA to enhance at least one of water-proofing and theft-vulnerability of said apparatus, wherein said anti-theft latch is electrically coupled to said PCBA with electrically conductive double-sided adhesive material.

18. The apparatus of claim 17, wherein said adhesive material comprises a gasket.

19. The apparatus of claim 18, wherein said anti-theft latch is electrically coupled to a ground pad on said first surface of said PCBA.

20. The apparatus of claim 1, further including a shock isolation mounting for said shield, disposed between said second surface of said shield and said first surface of the touchpad; wherein said shock isolation mounting helps retain said touchpad to said support.

21. The apparatus of claim 1, wherein said support includes optical quality transparent material.

22. An apparatus for ruggedizing and securing a touchpad assembly comprising:
    a touchpad having spaced-apart first and second surfaces, to receive a data signal from a user and to couple said signal to a cable;
    a printed circuit board assembly (PCBA) having spaced-apart first and second surfaces, said PCBA coupled to said cable to receive said data signal from said touchpad;
    a support including at least one of polycarbonate and glass, the support having a first surface upon which said touchpad and said PCBA are disposed;
    a shield having spaced-apart first and second surfaces, said shield over-covering said touchpad, said cable, and said PCBA, and defining a through opening in said first surface overlying and permitting access to said touchpad; and means for securing said shield to said PCBA to enhance at least one of water-proofing and theft-vulnerability of said apparatus.

23. The apparatus of claim 1 wherein said shield comprises a metallic material.

24. The apparatus of claim 1, wherein said cable is a flex cable.

25. A method of ruggedizing and securing a touchpad assembly, the method comprising the following steps:

supporting a touchpad and a printed circuit board assembly (PCBA) with a lens, such that the touchpad and PCBA lie on a first surface of the lens;

coupling a cable between the touchpad and the PCBA;

providing a shield having spaced-apart first and second surfaces to cover said touchpad, cable, and PCBA, said shield defining an opening sized to permit accessing said touchpad; and coupling a seal between said shield and said lens, the seal in contact with said cable, to enhance at least one of water-proofing and theft-vulnerability of the assembly.

26. The method of claim 25, wherein said shield is mounted to said lens.

27. The method of claim 25, further including defining a sealed security chamber space between portions of said shield, said PCBA, and said lens, and at least partially sealing said space with said seal.

28. The method of claim 27, further including sealing a second surface of said shield and a first surface of said lens around a perimeter of said PCBA, at least in part using said seal.

29. The method of claim 27, further including sealing a second surface of the PCBA and a first surface of the lens using at least one second chamber seal disposed between said second surface of said PCBA and said first surface of said lens.

30. A method of ruggedizing and securing a touchpad assembly, the method comprising:

supporting a touchpad and a printed circuit board assembly (PCBA) with a lens, such that the touchpad and PCBA lie on a first surface of the lens; coupling a cable between the touchpad and the PCBA;

providing a shield having spaced-apart first and second surfaces to cover said touchpad, cable, and PCBA, said shield defining an opening sized to permit accessing said touchpad;

providing at least one of a water-proofing enhancement mechanism and an anti-theft mechanism, to secure said shield to said PCBA; and injecting encapsulation resin through an injection port, defined in said shield, into a security chamber space, such that said anti-theft latch is molded into said encapsulation resin and such that upon setting and curing of said resin, said PCBA cannot readily be disassembled.

31. A method of ruggedizing and securing a touchpad assembly, the method comprising the following steps:

supporting a touchpad and a printed circuit board assembly (PCBA) with a lens, such that the touchpad and PCBA lie on a first surface of the lens;

coupling a cable between the touchpad and the PCBA;

providing a shield having spaced-apart first and second surfaces to cover said touchpad, cable, and PCBA, said shield defining an opening sized to permit accessing said touchpad;

providing at least one of a water-proofing enhancement mechanism and an anti-theft mechanism, to secure said shield to said PCBA; and welding a metallic spring to said shield and to said latch.

32. A method of ruggedizing and securing a touchpad assembly, the method comprising the following steps:

supporting a touchpad and a printed circuit board assembly (PCBA) with a lens, such that the touchpad and PCBA lie on a first surface of the lens;

coupling a cable between the touchpad and the PCBA;

providing a shield having spaced-apart first and second surfaces to cover said touchpad, cable, and PCBA, said shield defining an opening sized to permit accessing said touchpad;

providing at least one of a water-proofing enhancement mechanism and an anti-theft mechanism, to secure said shield to said PCBA; and electrically coupling said anti-theft latch to said PCBA.

33. The method of claim 32, wherein the step of securing further comprises electrically coupling the anti-theft latch to the PCBA by contact with a ground pad on the first surface of the PCBA.

34. The method of claim 25, further including providing a shock isolation mount to retain said touchpad to said lens, said mount being disposed between a second surface of said shield and a first surface of said touchpad.

35. An apparatus according to claim 1, wherein the support comprises a lens.

* * * * *

UNITED STATES PATENT AND TRADEMARK OFFICE
CERTIFICATE OF CORRECTION

PATENT NO. : 6,784,875 B2
APPLICATION NO. : 10/044095
DATED : August 31, 2004
INVENTOR(S) : Siltex Peter Yuen It is certified that error appears in the above-identified patent and that said Letters Patent is hereby corrected as shown below:

In column 1, between lines 63 and 64, please insert the following:

--FIG.3 is an end elevational view of the touchpad assembly of FIG. 1, taken along the line 3-3;--

Column 2, line 6 should read as follows:

--...of double-sided adhesive tape, according to the present invention;--

Column 3, line 15 should read as follows:

--...and shield 28 has a thickness less than T2.--

Column 6, Claim 5 should read as follows:

--The apparatus of Claim [1] 4, wherein said seal includes at least one chamber seal[s] to seal and define a security chamber space between portions of said shield, said PCBA, and said support lens.--

Column 6, Claim 6 should read --claim 5--.

Column 8, Claim 19 so as to depend on claim 16.

Column 8, Claim 20 so as to depend on claim 4.

Column 8, Claim 21 so as to depend on claim 4.

Column 9, Claim 9 so as to depend on claim 6.

UNITED STATES PATENT AND TRADEMARK OFFICE
CERTIFICATE OF CORRECTION

PATENT NO. : 6,784,875 B2
APPLICATION NO. : 10/044095
DATED : August 31, 2004
INVENTOR(S) : Siltex Peter Yuen It is certified that error appears in the above-identified patent and that said Letters Patent is hereby corrected as shown below:

Column 9, Claim 12 so as to depend on claim 4.

Column 9, Claim 23 so as to depend on claim 4.

Column 9, Claim 24 so as to depend on claim 4.

Column 10, Claim 35 so as to depend on claim 4.

Signed and Sealed this

Twenty-fifth Day of December, 2007

JON W. DUDAS
*Director of the United States Patent and Trademark Office*